United States Patent [19]

Song

[11] Patent Number: 5,434,726

[45] Date of Patent: Jul. 18, 1995

[54] TAPE RUNNING DEVICE OF VIDEO CASSETTE RECORDER

[75] Inventor: Geun H. Song, Su Won-Si, Rep. of Korea

[73] Assignee: Goldstar Co., Ltd., Seoul, Rep. of Korea

[21] Appl. No.: 160,149

[22] Filed: Dec. 2, 1993

[30] Foreign Application Priority Data

Dec. 2, 1992 [KR] Rep. of Korea ............... 23126/92

[51] Int. Cl.⁶ .................. G11B 5/027; G11B 15/32
[52] U.S. Cl. .................................. 360/85; 242/341; 360/84
[58] Field of Search .................. 360/85, 95, 84, 83; 369/75.2, 77.1, 34, 36; 242/194, 197

[56] References Cited

U.S. PATENT DOCUMENTS

| | | | |
|---|---|---|---|
| 4,841,392 | 6/1989 | Muramatsu et al. | 360/85 |
| 4,896,225 | 1/1990 | Nakatsuyama et al. | 360/73.06 |
| 5,227,933 | 7/1993 | Konishi et al. | 360/85 |

FOREIGN PATENT DOCUMENTS

| | | | |
|---|---|---|---|
| 57-208664 | 12/1982 | Japan | 360/85 |
| 63-285751 | 11/1988 | Japan . | |
| 2-285544 | 11/1990 | Japan . | |

Primary Examiner—Stuart S. Levy
Assistant Examiner—Allen Cao
Attorney, Agent, or Firm—Birch, Stewart, Kolasch & Birch

[57] ABSTRACT

A tape running device of a video cassette recorder. This device comprises a capstan shaft, an arm pinch having both a tape guider and a rotatable pinch roller, a holder provided under the arm pinch in order to elevate, lower and rotate the arm pinch, a gear pinch engaging with the holder for guiding the elevating and lowering motion of the holder, a guide plate engaging with the holder for causing the holder to be vertically elevated and lowered, a take-up arm rotatably mounted on the main plate and having a shaft for pulling the tape out of a tape cassette, and a connection gear gearing into both the gear pinch and the take-up arm in order to transmit the rotational force of a drive motor to them and rotating the holder in order to rotate the arm pinch toward the capstan shaft. The tape is run under the condition that its nonmagnetic surface is wrapped about both the tape guider and the pinch roller. The tape in a FF/REW mode is run under the condition that it is separated from all the pinch roller, the tape guider and the capstan shaft but guided by the shaft of the take-up arm.

8 Claims, 6 Drawing Sheets

TAPE RUNNING DEVICE OF VIDEO CASSETTE RECORDER

BACKGROUND OF THE INVENTION

1. Field of the Invention

The present invention relates in general to a deck mechanism of a video cassette recorder, and more particularly to a tape running device of such a deck mechanism of the video cassette recorder.

2. Description of the Prior Art

Figure 1:
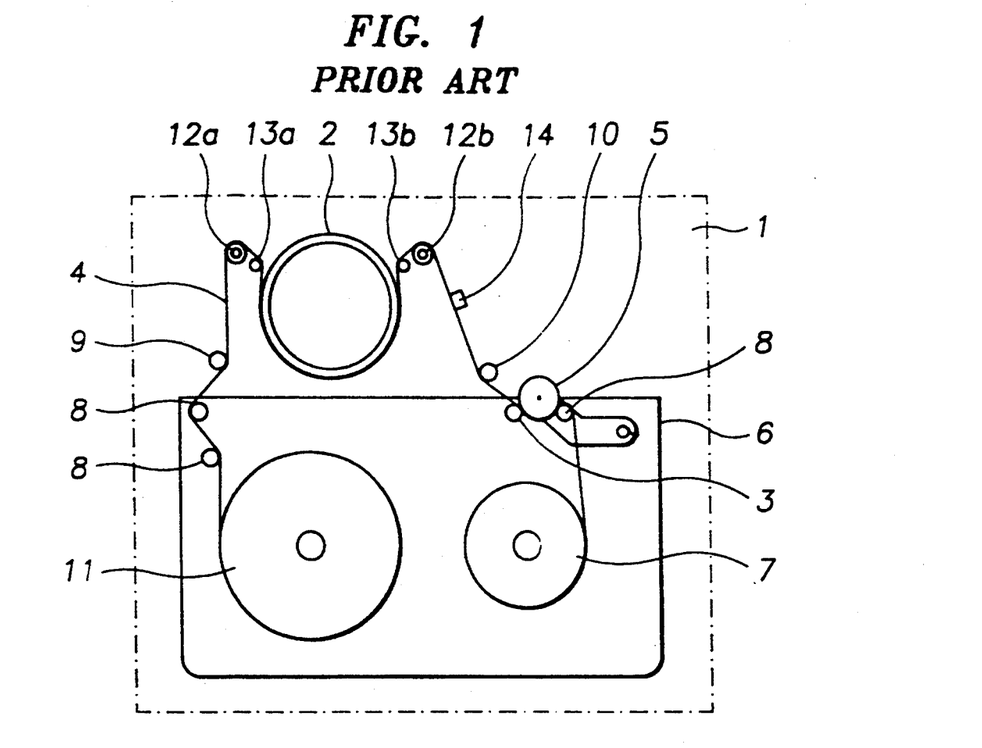
FIG. 1 is a schematic plan view of a conventional tape running device of a video cassette recorder.
Figure 2:
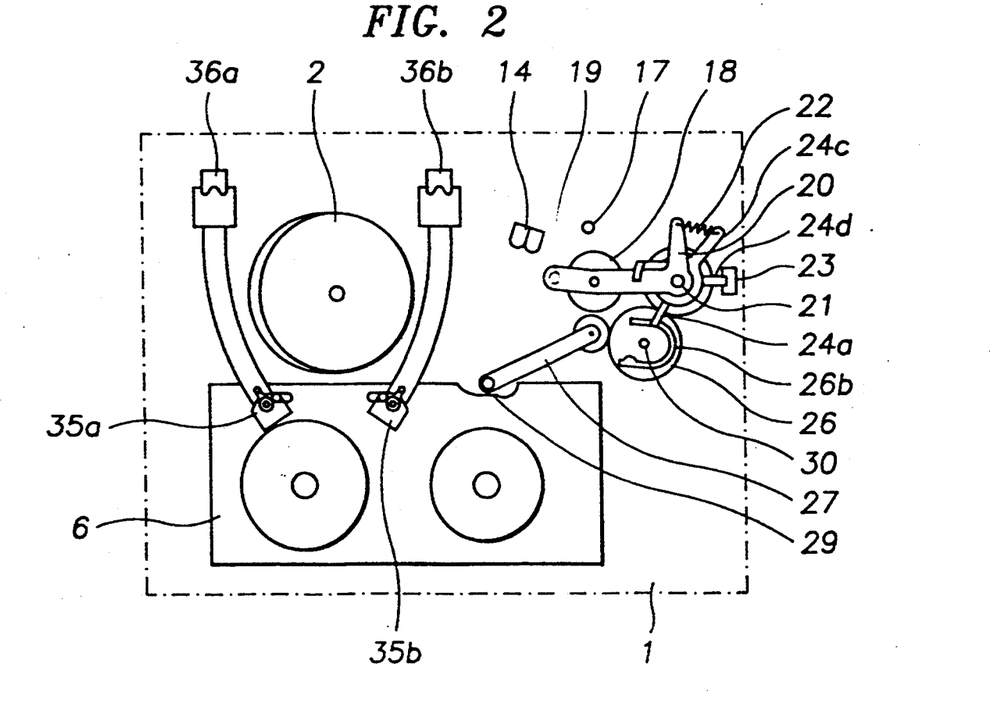
FIG. 2 is a schematic plan view of a tape running device of a video cassette recorder in accordance with the present invention.

With reference to FIG. 1, there is shown a conventional tape running device of a video cassette recorder (VCR). The tape running device includes a rotary head drum 2 which is rotatably mounted on a rear section of a main plate 1 of a deck mechanism of the VCR. A pinch roller 5 is rotatably mounted on the main plate 1 and comes into close contact with a capstan shaft 3 in order to run a tape 4 in cooperation with this shaft 3. The device also includes a tape guider 8 which is positioned inside an inserted tape cassette 6 and guides the tape 4 into the nip between the rotatable pinch roller 5 and the capstan shaft 3. A pair of guide posts, that is, first and second guide posts 9 and 10 are provided on the main plate 1 on opposed sides of the head drum 2 in order to guide the tape 4 running through the tape running path. The device further includes first and second guide rollers 12a and 12b and first and second slant posts 13a and 13b which are fixedly mounted on a base slant (not shown) in such a manner that a guide roller 12a or 12b and a corresponding slant post 13a or 13b are positioned on a side of the head drum 2. Here, each of the slant posts 13a and 13b is positioned at a predetermined inclination angle, so that it smoothly guides the tape 4 from or to the slant side surface of the head drum 2. In this regard, the guide rollers 12a and 12b and the slant posts 13a and 13b precisely guide the tape 4 extending between a supply reel 11 and a take-up reel 7 of the tape cassette 6 to the slant side surface of the head drum 2 in a play mode of the VCR.

In the above tape running device, when the tape cassette 6 is completely loaded on the main plate 1, the tape 4 is pulled out of the cassette 6 in order to be positioned on the tape running path. In order to position the tape 4 on the tape running path, both the guide rollers 12a and 12b and the slant posts 13a and 13b, which are mounted on the base slant, move rearward together with the tape 4 unwinding from the tape supply reel 11 and the tape take-up reel 7 of the cassette 6. Hence, the tape 4 between the tape supply reel 11 and the tape take-up reel 7 passes through the head drum 2, the audio and control head 14, the second guide post 10 and the nip between the capstan shaft 3 and the pinch roller 5. At this time, the magnetic recording layer of the tape 4 contacts with both the second guide post 10 and the pinch roller 5.

However, in the above taperunning device, the tape 4 of the tape cassette 6 should be interposed between the capstan shaft 3 and the pinch roller 5 when the cassette 6 is loaded on the main plate 1. Additionally, the second guide post 10 is fixed to the main plate 1. Hence, the above elements 3, 5 and 10 should be placed on their specified positions, so that the tape running device does not achieve the recent trend of miniaturization of the VCR. Furthermore, the second guide post and a rubber surface of the pinch roller 5 necessarily contact with the magnetic recording layer of the tape 4, thereby causing damage of the magnetic recording layer of the tape 4. When the rubber surface of the pinch roller 5 is stuck with a foreign substance, the magnetic recording layer of the tape 4 may be stained with the foreign substance and may cause deterioration of the picture quality.

SUMMARY OF THE INVENTION

It is, therefore, an object of the present invention to provide a tape running device of a video cassette recorder (VCR) in which the aforementioned problems can be overcome and which achieves the recent trend of miniaturization of the VCR.

It is another object of the present invention to provide a tape running device of a VCR in which the tape of a tape cassette runs along the tape running path in such a manner that the nonmagnetic surface of the tape or the surface opposed to the magnetic recording layer surface is wrapped about the guide post and the pinch roller, thus to be reliably prevented from being stained with a foreign substance and to provide a desired clear picture.

It is a further object of the present invention to provide a tape running device of a VCR in which the tape of a tape cassette in FF/REW mode runs while contacting with no capstan shaft, no pinch roller or no guide post, so that it runs at a high speed without damage.

In order to accomplish the above objects, a tape running device of a VCR in accordance with an embodiment of the present invention comprises a capstan shaft; an arm pinch having both a tape guider and a rotatable pinch roller and mounted on a main plate such that it is elevated, lowered and rotated, the pinch roller coming into close contact with the capstan shaft with a tape interposed therebetween when the arm pinch is lowered and rotated toward the capstan shaft, thereby running the tape, a holder provided under the arm pinch in order to cooperate with the arm pinch, the holder being provided with a boss, a first protrusion and a second protrusion on its outer periphery and with a guide pin on its inner periphery; a gear pinch having a guide groove on its outer surface for receiving and guiding the guide pin of the holder, thereby elevating and lowering the holder; a guide plate having a guide opening for receiving and guiding the second protrusion of the holder, thereby causing the holder to be vertically elevated and lowered; a take-up arm rotatably mounted on the main plate and having a shaft for pulling the tape out of a tape cassette; a connection gear gearing into both the gear pinch and the take-up arm in order to transmit the rotational force of driving means to them and being provided on its upper surface with a cam slot for receiving and guiding the boss of the holder in order to rotate the holder; and a connection spring connected between the first protrusion of the holder and the arm pinch in order to rotate the arm pinch toward the capstan shaft when the holder is rotated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which:

FIGS. 3A and 3B are partially enlarged views of the tape running device of the present invention, respectively, in which:

FIGS. 4A to 4C are partially enlarged plan views of the tape running device of the present invention, respectively, in which:

DESCRIPTION OF THE PREFERRED EMBODIMENT

Referring to the accompanying drawings, FIGS. 2 to 6 show a tape running device according to an embodiment of the present invention, a capstan shaft 17 connected to a capstan motor (not shown) upwardly penetrates a main plate 1 at a side of a audio and control head 14 and comes into contact with a magnetic recording layer of a tape 4 of a tape cassette 6 when a rotatable pinch roller 18 comes into close contact with this shaft 17 with the tape 4 interposed therebetween. At a side of the capstan shaft 17, an arm pinch 20 is rotatably mounted on the main plate 1 by a shaft 21 such that it is rotated about this shaft 21. This arm pinch 20 includes a tape guider 19, which allows the tape 4 to run while maintaining a predetermined height, and the pinch roller 18 comes into close contact with the capstan shaft 17 in order to run the tape 4 in cooperation with this shaft 17. A holder 24 is placed under the arm pinch 20 such that it is elevated and lowered together with the arm pinch 20.

In order to elevate and lower the holder 24 together with the arm pinch 20, an extension part 24e upwardly extending from the upper section of the holder 24 is bent in order to be caught by the upper surface of the arm pinch 20. At this time, the arm pinch 20 and the holder 24 are rotated together with each other.

Figures 5, 5A:
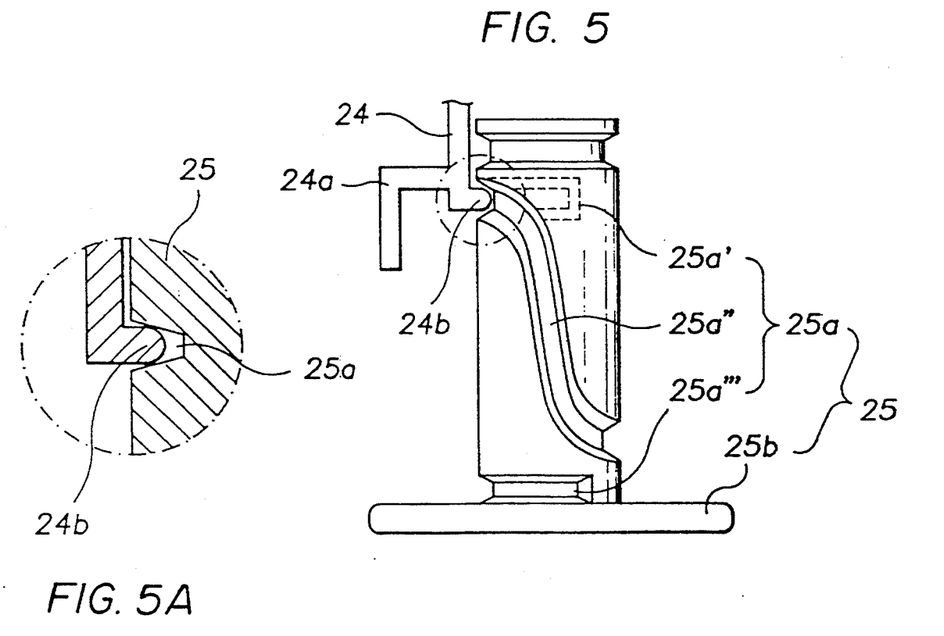
FIG. 5 is an enlarged perspective view of a lifting unit, comprising a gear pinch and a holder guide pin, of the device of the present invention.
FIG. 5A is an enlarged sectional view of the guide pin engaged with the guide groove as shown in FIG. 5.

The holder 24 is provided, on its outer peripheral surface, with a boss 24a bent downwardly, a first protrusion 24c connected to an end of the arm pinch 20 by a coil spring 22, and a second protrusion 24d. This holder 24 is also provided, on its inner peripheral surface, with a guide pin 24b as shown in FIG. 5.

Figure 6:
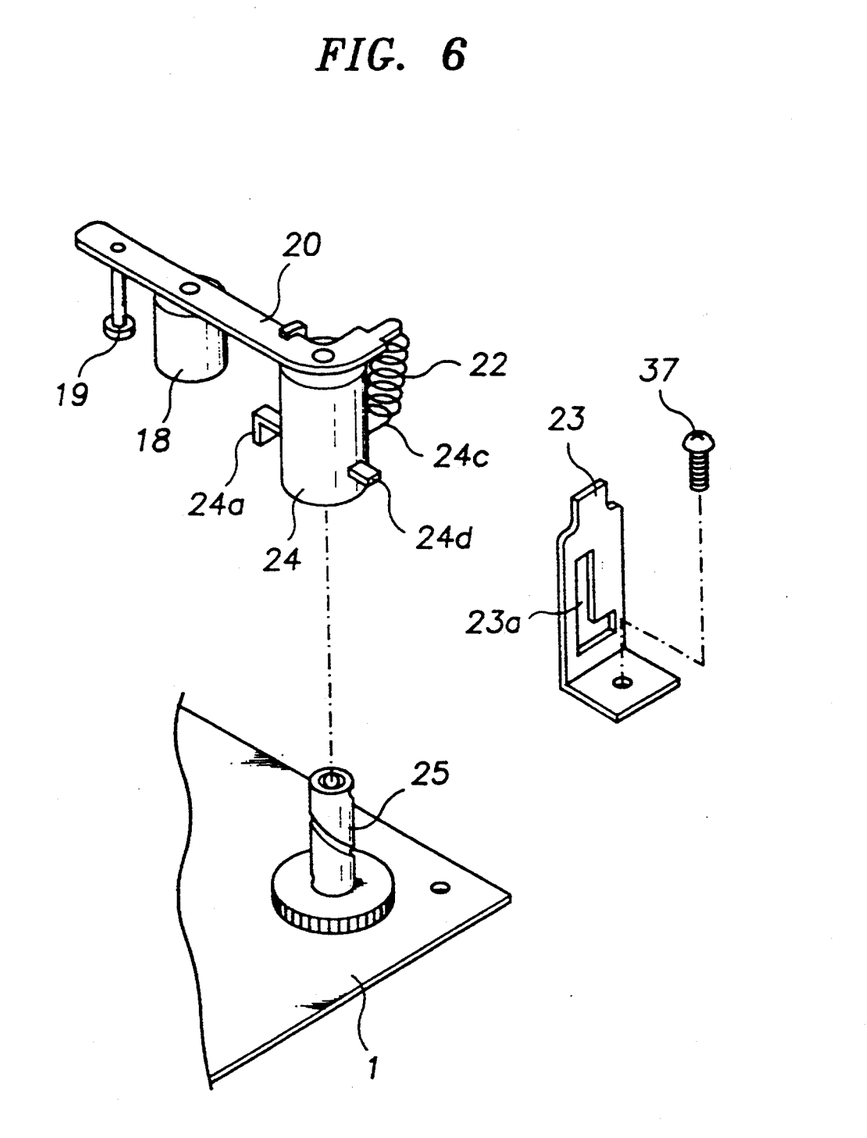
FIG. 6 is an exploded perspective of the lifting unit and a guide plate of the device of the present invention.

A guide plate 23, having an L-shaped guide opening 23a for receiving and guiding the second protrusion 24d of the holder 24, is screwed to the upper surface of the main plate 1 by a set screw 37 as shown in FIG. 6. The tape running device further includes a gear pinch 25, which is mounted on the shaft 21 and is provided with an up/down guide groove 25a on its side surface and with a spur gear 25b at its lower end. The up/down guide groove 25a receives and guides the guide pin 24b of the holder 24 in order to elevate or lower this holder 24 with respect to the gear pinch 25. As shown in FIG. 5, the up/down guide groove 25a comprises upper and lower horizontal sections 25a' and 25a''' and a spiral middle section 25a''.

Figure 3A:
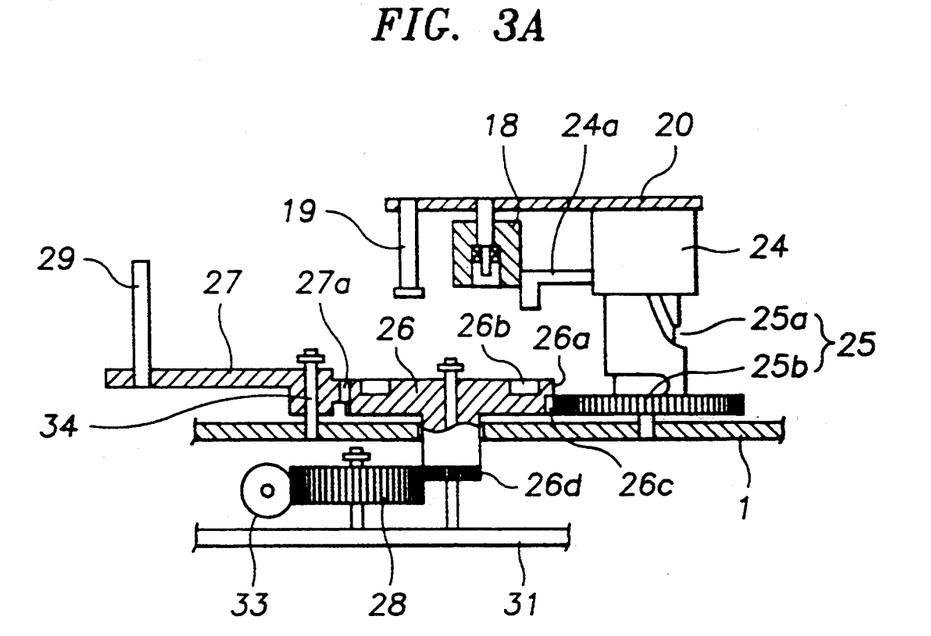
FIG. 3A shows a pinch roller in an elevated position.
Figure 3B:
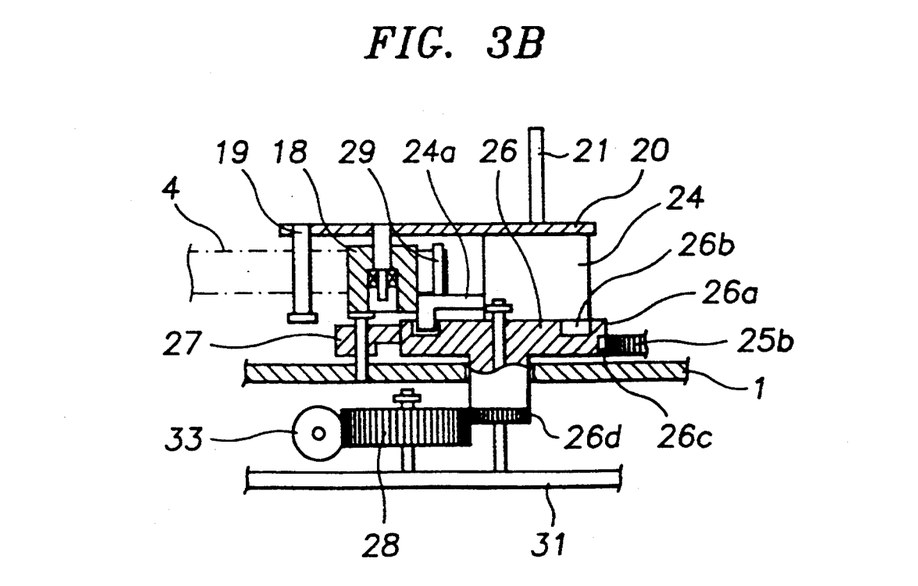
FIG. 3B shows the pinch roller in a lowered position.

As best seen in FIGS. 3A and 3B, a first connection gear 26 is rotatably mounted on a shaft 30 of a bracket 31 such that this connection gear 26 is placed on the main plate 1. This first connection gear 26 is applied with the rotational force of a drive motor (not shown) through a worm 33 and a worm gear or a second connection gear 28.

The first connection gear 26 includes a partially toothed part 26a and a totally toothed part or a spur gear 26c at its outer peripheral surface. The spur gear 26c of the first connection gear 26 always gears into the spur gear 25b of the gear pinch 25.

The first connection gear 26 is also provided with a cam slot 26b on its upper surface and with a lower gear 26d at its lower end. The lower gear 26d of the first connection gear 26 gears into the second connection gear 28 in order to be applied with the rotational force of the drive motor through the worm 33 and the second connection gear 28.

In addition to the above elements, a take-up arm 27 is rotatably mounted on the main plate 1 by a shaft 34 such that it is rotated about this shaft 34. This take-up arm 27 includes an erect shaft 29 which is mounted on an end of the arm 27 opposed to the other end having the shaft 34. The arm 27 also includes a gear 27a at the other end thereof having the shaft 34. This gear 27a of the take-up arm 27 cooperates with the partially toothed part 26a of the first connection gear 26.

Figure 4A:
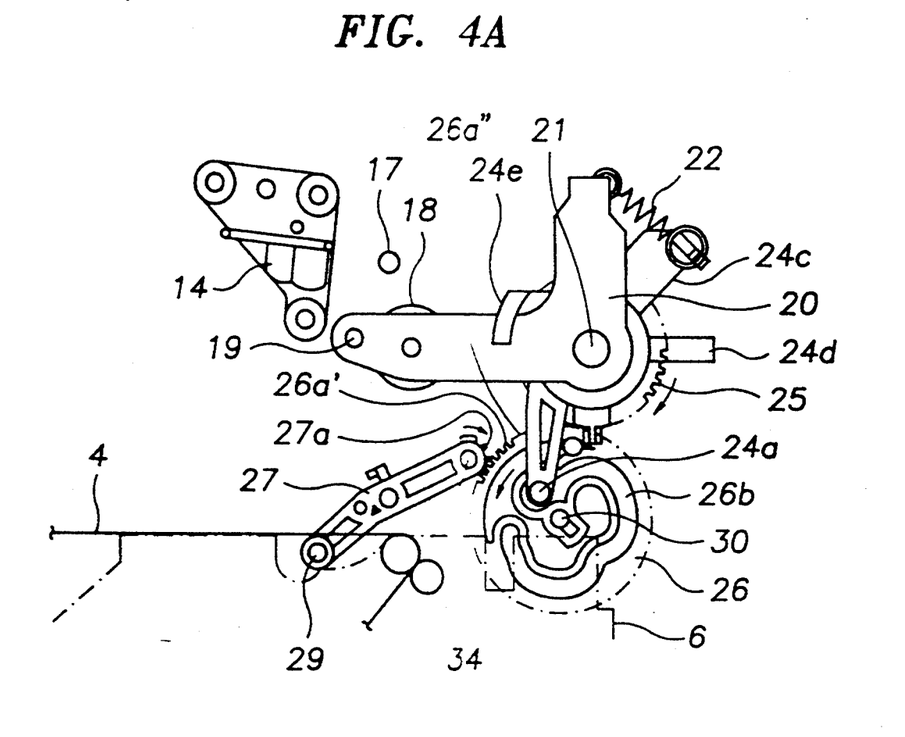
FIG. 4A shows the device before a take-up arm pulls the tape out of a tape cassette.

In operation of the above tape running device, the worm 33 connected to an output shaft of the drive motor is rotated by the rotational force of the drive motor when this drive motor starts its rotation in the state that the tape cassette 6 is loaded on the main plate 1 as shown in FIGS. 3A and 4A. The rotational force of the worm 33 is transmitted to the first connection gear 26 through the second connection gear 28 and the lower gear 26d of this connection gear 26, thus to rotate this first connection gear 26 counterclockwise. At this time, the erect shaft 29 of the take-up arm 27 is positioned at a place inside the tape 4 of the cassette 6, so that it faces the nonmagnetic surface of the tape 4 as shown in FIG. 4A.

When the first connection gear 26 is rotated as described above, the take-up arm 27 is applied with the rotational force of the first connection gear 26 since a toothed section 26a' of the partially toothed part 26a of the first connection gear 26 gears into the gear 27a of the take-up arm 27. The take-up arm 27 is thus rotated clockwise about the shaft 34 and the erect shaft 29 of the take-up arm 27 pulls the tape 4 out of the tape cassette 6.

Figure 4B:
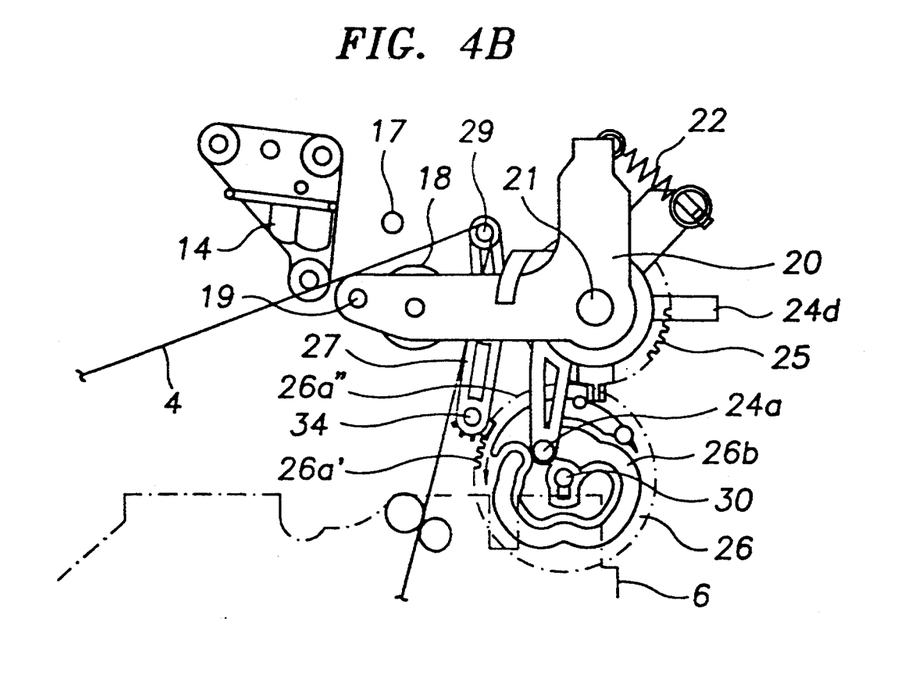
FIG. 4B shows the device after the take-up arm completely pulls the tape out of the tape cassette.

The continued rotation of the first connection gear 26 causes the gear 27a of the take-up arm 27 to come into contact with a plane surface section 26a'' of the partially toothed part 26a of the first connection gear 26 as shown in FIG. 4B. Hence, the take-up arm 27 maintains the position that it comes into contact with a plane surface section 26a" even if the rotational force of the first connection gear 26 is applied to the take-up arm 27.

At the same time of the above clockwise rotation of the take-up arm 27, a pair of base slants 35a and 35b movably positioned at opposed sides of the head drum 2 move along with the tape 4, thus to make this tape 4 come into contact with the slant side surface of the head drum 2. This movement of the base slants 35a and 35b ends when these base slants 35a and 35b engage with a pair of V-shaped stoppers 36a and 36b, respectively. The counterclockwise rotation of the first connection gear 26 also rotates clockwise the gear pinch 25 of which the spur gear 25b gears into the spur gear 26c of this first connection gear 26.

In this case, the guide pin 24b of the holder 24 is received and guided by the upper horizontal section 25a' (see FIG. 5) of the up/down guide groove 25a of the gear pinch 25 until the take-up arm 27 achieves the clockwise rotated position shown in FIG. 4B. Hence, the holder 24 is not lowered with respect to the gear pinch 25 as shown in FIG. 3A. Thus, there is no interference between the take-up arm 27 and both the pinch roller 18 and the tape guider 19 of the arm pinch 20 during the clockwise rotation of the take-up arm 27 about the shaft 34. However, after the take-up arm 27 achieves the rotated position of FIG. 4B, the guide pin 24b of the holder 24 is guided by the spiral section 25a" of the up/down guide groove 25a of the gear pinch 25, thus to cause the holder 24 as well as the arm pinch 20 to be lowered with respect to the gear pinch 25 as shown in FIG. 3B. The pinch roller 18 and the tape guider 19 of the arm pinch 20 are thus placed on their lowered positions.

At this time, the second protrusion 24d of the holder 24 is lowered while being guided by the vertical section of the L-shaped guide opening 23a of the guide plate 23. The holder 24 is thus not rotated with respect to the gear pinch 25 but vertically lowered.

As best seen in the encircled enlarged sectional view of FIG. 5, the up/down guide groove 25a of the gear pinch 25 shows a trapezoidal sectional profile which is diverged toward the outer surface of the gear pinch 25 and the distal end of the guide pin 24b of the holder 24 received and guided by the guide groove 25a has a hemispherical section. Therefore, the guide pin 24b of the holder 24 moves upwards or downwards along the up/down guide groove 25a while point-contacting with the side surfaces of the groove 25a.

When the holder 24 reaches its fully lowered position with respect to the gear pinch 25, the downwardly bent boss 24a of this holder 24 is inserted into the cam slot 26b formed on the upper surface of the first connection gear 26. In accordance with the counterclockwise rotation of the first connection gear 26, the boss 24a of the holder 24 is guided by the cam slot 26b and this causes clockwise rotation of the holder 24. The arm pinch 20 connected to the first protrusion 24c of the holder 24 by the coil spring 22 is thus rotated clockwise, so that its pinch roller 18 comes into close contact with the capstan shaft 17 with the tape 4 interposed therebetween.

Figure 4C:
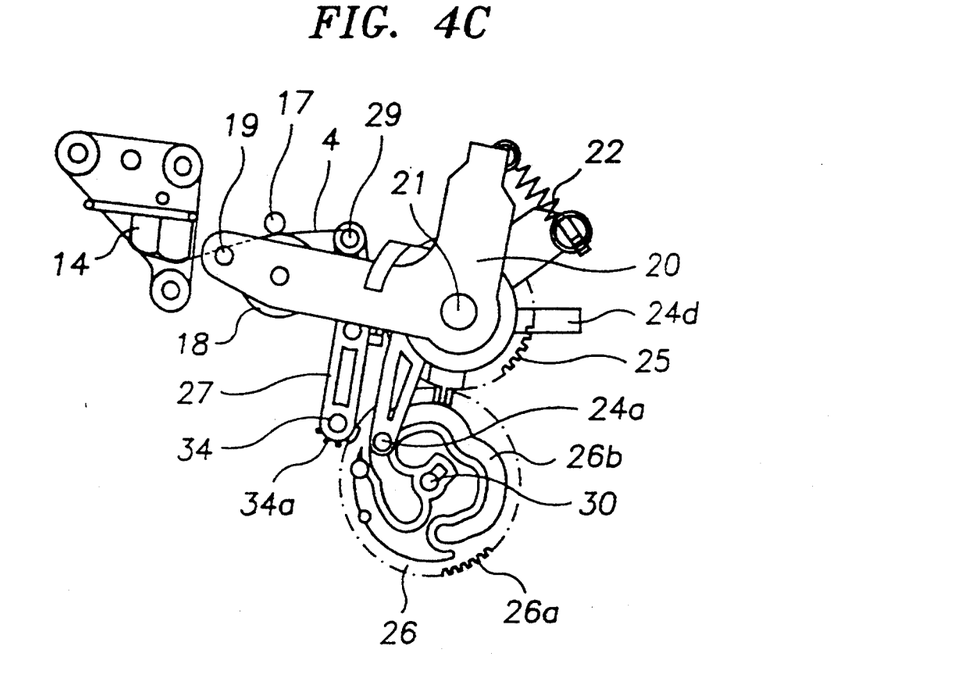
FIG. 4C shows the device in a play mode.

In this state, the tape 4 is wrapped about and contacts by its nonmagnetic surface with both the tape guider 19 and the pinch roller 18 as shown in FIG. 4C, thus to end the loading operation. At this time, the holder 24 maintains its lowered position since its guide pin 24b is received and guided by the lower horizontal section 25a''' of the up/down guide groove 25a of the gear pinch 25.

Figure 4D:
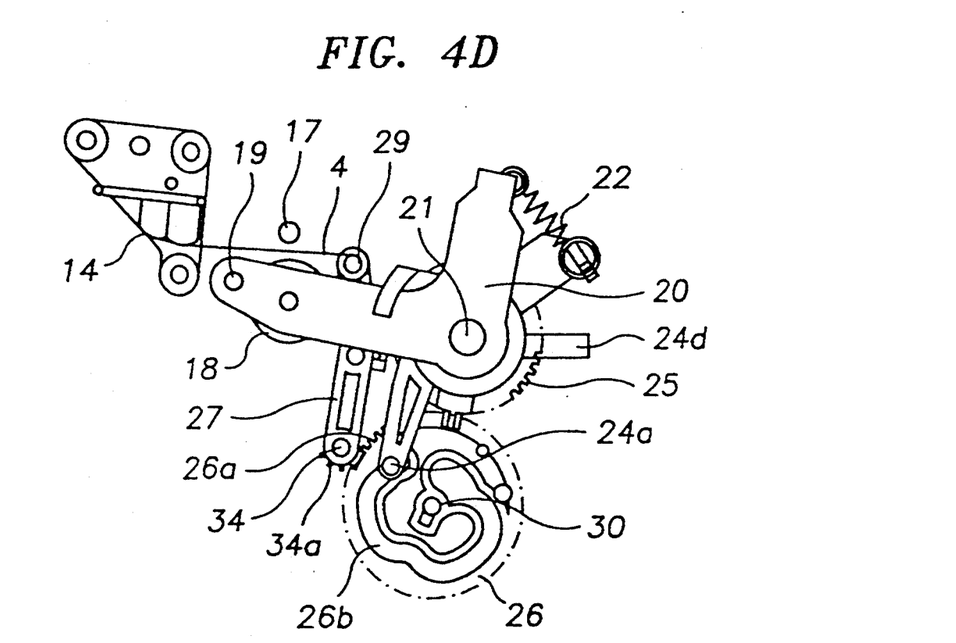
FIG. 4D shows the device in a FF/REW mode.

In a FF/REW mode of the VCR, the boss 24a of the holder 24 is guided by the cam slot 26b of the first connection gear 26 toward the outside of this slot 26b, thus rotating the arm pinch 20 in the counterclockwise direction, that is, a direction opposed to a tape compressing direction. Thus, both the pinch roller 18 and the tape guider 19 which have contacted with the nonmagnetic surface of the tape 4 is separated from the nonmagnetic surface of the tape 4 as shown in FIG. 4D. The tape 4 in the FF/REW mode thus runs at a high speed under the condition that it does not contact with both the pinch roller 18 and the tape guider 19 but passes through the audio and control head 14 and is wrapped about the shaft 29 of the take-up arm 27. Hence, damage of the tape surface caused by contacting with both the pinch roller 18 and the tape guider 19 is reliably prevented.

As described above, in the tape running device of the present invention, both the tape guider and the pinch roller are provided on a rotatable arm pinch and, as a result, the tape of a tape cassette is compressed to a capstan shaft irrespective of position of the mute head, thus to achieve the recent trend of miniaturization of the VCR without space limit.

In a tape running mode of the VCR, the tape guider contacts with the nonmagnetic surface of the tape, so that it gives no damage to the magnetic recording layer of the tape.

In a FF/REW mode of the VCR, the tape runs at a high speed under the condition that it contacts with neither the pinch roller nor the tape guider but passes through the mute head and is wrapped about the shaft of the take-up arm, so that damage of the tape surface caused by contacting with both the pinch roller and the tape guider is reliably prevented.

When the arm pinch is elevated or lowered with respect to the gear pinch, the guide pin of this arm pinch moves upwards or downwards along the up/down guide groove of the gear pinch while point-contacting with the side surfaces of this up/down guide groove, thus to minimize the load applied to the loading motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tape running device of a video cassette recorder comprising:
 a main plate;
 a capstan shaft disposed on said main plate;
 an arm pinch having both a tape guider and a rotatable pinch roller disposed thereon, said arm pinch being mounted on said main plate wherein said arm pinch is elevated, lowered and rotated with respect to said main plate by a holder provided under said arm pinch, said pinch roller coming into close contact with said capstan shaft with a tape interposed therebetween when said arm pinch is lowered and rotated toward said capstan shaft thus to cause said tape guider and said pinch roller to guide said tape and to come into close contact with said capstan shaft, thereby running said tape;
 a gear pinch engaging with said holder for guiding the elevating and lowering motion of said holder;

a guide plate engaging with said holder for restricting rotation of said holder while said gear pinch is rotated thereby causing said holder to be vertically elevated and lowered;

a take-up arm rotatably mounted on said main plate and having a shaft for pulling said tape out of a tape cassette; and a connection gear gearing into both said gear pinch and said take-up arm in order to transmit the rotational force of driving means to said gear pinch and said take-up arm and rotating said holder in order to rotate said arm pinch toward said capstan shaft.

2. The tape running device according to claim 1, wherein said tape is run under a condition that its nonmagnetic surface is wrapped about both said tape guider and said pinch roller.

3. The tape running device according to claim 1, wherein said tape in a FF/REW mode is run under a condition that it is separated from all said pinch roller, said tape guider and said capstan shaft but guided by said shaft of the take-up arm.

4. A tape running device of a video cassette recorder comprising:

a main plate;

a capstan shaft disposed on said main plate an arm pinch having both a tape guider and a rotatable pinch roller disposed thereon, said arm pinch being mounted on said main plate wherein said arm pinch is elevated, lowered and rotated with respect to said main plate by a holder provided under said arm pinch, said pinch roller coming into close contact with said capstan shaft with a tape interposed therebetween when said arm pinch is lowered and rotated toward said capstan shaft, thereby running said tape;

said holder being provided with a boss, a first protrusion and a second protrusion on its outer periphery and with a guide pin on its inner periphery;

a gear pinch having a guide groove on its outer surface for receiving and guiding said guide pin of the holder, thereby elevating and lowering said holder;

a guide plate having a guide opening for receiving and guiding said second protrusion of the holder, thereby restricting rotation of said holder while said gear pinch is rotated causing said holder to be vertically elevated and lowered;

a take-up arm rotatably mounted on said main plate and having a shaft for pulling said tape out of a tape cassette;

a connection gear gearing into both said gear pinch and said take-up arm in order to transmit the rotational force of driving means to said gear pinch and said take-up arm and being provided on its upper surface with a cam slot for receiving and guiding said boss of the holder in order to rotate said holder; and a connection spring connected between said first protrusion of the holder and said arm pinch in order to rotate said arm pinch toward said capstan shaft when said holder is rotated.

5. The tape running device according to claim 4, wherein said guide groove of the gear pinch has a trapezoidal sectional profile diverged toward an outer surface of said gear pinch, and a distal end of said guide pin of the holder has a hemispherical section, so that said guide pin of the holder moves along said guide groove while point-contacting with side surfaces of said guide groove.

6. The tape running device according to claim 4, wherein said tape is run under a condition that its nonmagnetic surface is wrapped about both said tape guider and said pinch roller.

7. The tape running device according to claim 4, wherein said tape in a FF/REW mode is run under a condition that it is separated from all said pinch roller, said tape guider and said capstan shaft but guided by said shaft of the take-up arm.

8. The tape running device according to claim 4, wherein said connection gear includes a partially toothed part which gears with the take-up arm and a totally toothed part which gears with the gear pinch.

* * * * *